(12) United States Patent
Martinou et al.

(10) Patent No.: US 8,522,529 B2
(45) Date of Patent: Sep. 3, 2013

(54) PROPULSION UNIT FOR AIRCRAFT WITH HEAT EXCHANGER HAVING FRONT INLET FACES FOR COOLING AIR FLOW AND HOT AIR FLOW

(75) Inventors: Jean-Marc Martinou, L'Union (FR); Herve Marche, Roquettes (FR)

(73) Assignee: Airbus Operations SAS, Toulouse (FR)

( * ) Notice: Subject to any disclaimer, the term of this patent is extended or adjusted under 35 U.S.C. 154(b) by 760 days.

(21) Appl. No.: 11/996,019

(22) PCT Filed: Jul. 7, 2006

(86) PCT No.: PCT/FR2006/001695
§ 371 (c)(1),
(2), (4) Date: Sep. 11, 2008

(87) PCT Pub. No.: WO2007/012722
PCT Pub. Date: Feb. 1, 2007

(65) Prior Publication Data
US 2009/0025366 A1    Jan. 29, 2009

(30) Foreign Application Priority Data
Jul. 28, 2005  (FR) ..................................... 05 52352

(51) Int. Cl.
*F02K 99/00*   (2009.01)
*F02C 6/08*    (2006.01)
*F02C 6/04*    (2006.01)
*B64D 33/10*   (2006.01)

(52) U.S. Cl.
USPC ................... 60/266; 60/782; 60/785; 244/57

(58) Field of Classification Search
USPC ...................................... 60/266, 728, 782, 785
See application file for complete search history.

(56) References Cited

U.S. PATENT DOCUMENTS

| | | | |
|---|---|---|---|
| 4,971,137 A | | 11/1990 | Thompson et al. |
| 5,123,242 A | * | 6/1992 | Miller ........................ 60/226.1 |
| 5,729,969 A | | 3/1998 | Porte et al. |
| 5,915,469 A | * | 6/1999 | Abramzon et al. ......... 165/134.1 |
| 7,607,308 B2 | * | 10/2009 | Kraft et al. ...................... 60/785 |
| 7,810,312 B2 | * | 10/2010 | Stretton et al. .................. 60/266 |
| 7,856,824 B2 | * | 12/2010 | Anderson et al. ............... 60/728 |
| 2003/0218096 A1 | | 11/2003 | Marche |

FOREIGN PATENT DOCUMENTS

| | | |
|---|---|---|
| EP | 0469825 A | 2/1992 |
| EP | 0888966 A | 1/1999 |

* cited by examiner

*Primary Examiner* — Ehud Gartenberg
*Assistant Examiner* — Arun Goyal
(74) *Attorney, Agent, or Firm* — Perman & Green, LLP

(57) ABSTRACT

An aircraft propulsion unit including a turbojet and a heat exchanger located above the turbojet and drawing a cooling air stream and a hot air stream in the turbojet. Wherein the cooling air intake and hot air intake surfaces in the housing are directed forward of the turbojet and have normal lines inclined relative to the axis of the turbojet. The embodiment also concerns an aircraft equipped with at least one such propulsion unit.

5 Claims, 4 Drawing Sheets

PROPULSION UNIT FOR AIRCRAFT WITH HEAT EXCHANGER HAVING FRONT INLET FACES FOR COOLING AIR FLOW AND HOT AIR FLOW

CROSS REFERENCE TO RELATED APPLICATIONS

This application is the National Stage of International Application No. PCT/FR2006/001695, International Filing Date, 7 Jul. 2006, which designated the United States of America, and which International Application was published under PCT Article 21 (2) as WO Publication No. WO2007/012722 and which claims priority from French Application No. 0552352, filed on 28 Jul. 2005, the disclosures of which are incorporated herein by reference in their entireties.

BACKGROUND

1. Field

The disclosed embodiments relate to a propulsive assembly for aircraft comprising a jet engine and a heat exchanger. More specifically, the disclosed embodiments deal with the routing of the cooling air and of the hot air to the heat exchanger in which said flows are intended to circulate. The disclosed embodiments also relate to a position of the heat exchanger relative to the jet engine.

2. Brief Description of Related Developments

It is known that, to feed the air conditioning circuit of the pressurized cabin containing the crew and the passengers of an aircraft, compressed air must be taken from the compressors of the jet engines of said aircraft. This compressed air is routed by ducts from the jet engines to the air conditioning circuit of the pressurized cabin. However, in as much as the temperature of the air taken from the compressors of the jet engine is very high, normally greater than 400° C., it is vitally important to first cool this compressed air.

For this, it is known that a heat exchanger can be used to at least partially cool the compressed air taken from a compressor of the jet engine before injecting it into the air conditioning circuit. The heat exchanger comprises a housing in which a flow of hot air, originating from the compressor of the jet engine, crosses a flow of cooling air, taken from the fan case ducting of the jet engine. The cold air taken from the fan case ducting of the jet engine has a temperature in the region of 70° C. to 100° C. When the flows cross, there is a heat exchange making it possible, on leaving the housing of the heat exchanger, to obtain a sufficiently cooled compressed air, that is having a temperature of approximately 200° C. The flow of cooled hot air is then directed to the air conditioning circuit, whereas the flow of cooling air is discharged from the jet engine through openings provided in the cowl of the engine strut, or strut for fixing the jet engine to the wings of the aircraft.

One of the drawbacks of the heat exchanger is its bulk. In practice, the heat exchanger is more often than not positioned at the strut used to link the jet engine to a wing of the aircraft. Generally, the heat exchanger is joined to a top face of the strut. More specifically, the heat exchanger is fitted above the front part of the box forming the rigid structure of the strut, and inside the fairing covering said box. It is therefore necessary to lead the flow of hot air, that has to be cooled, and the flow of cooling air, that is to be used to cool the flow of hot air, from the jet engine situated under the strut, to the heat exchanger situated above the strut.

Currently, because of the position of the heat exchanger on the strut and the fact that the cold air and the hot air are taken from the jet engine, the hot air and cooling air intake ducts both pass through the strut box. The strut box is a working structure of the strut, which is weakened where the ducts pass through its structure. Moreover, the bulk of the ducts in the internal volume of the box is large, forcing said ducts to cross inside the box. Such crossings can make it difficult to fit cooling air and hot air intake ducts on the jet engine and the heat exchanger.

Moreover, the cold air is currently taken laterally on the jet engine, at the fan case ducting, so that the cooling air intake duct, used to bring the flow of cooling air from the jet engine to the heat exchanger, must pass through the cowl of a thrust reverser of the jet engine. Now, the cowl of the thrust reverser has a kinematic whereby it can have a closed position and an open position. Thus, when the cowl of the thrust reverser is open, the link between the cooling air intake duct and the cowl of the reverser cannot be made. It is therefore necessary to provide a link system with a seal to enable a leak-free coupling between the cooling air intake duct and the cowl of the reverser to be made.

SUMMARY

The aspect of the disclosed embodiments are therefore to provide an alternative to the existing propulsive assemblies, by modifying the path of the cold air and hot air flows towards the heat exchanger. Thus, we avoid weakening the structure of the strut box and simplify the mounting of the heat exchanger on the strut and on the jet engine.

For this, in the disclosed embodiments, it is recommended to have the flow of hot air and the flow of cold air enter from the front into the housing of the heat exchanger. The term "from the front" should be understood to mean facing the flow of air located outside the exchanger. Not only the flow of hot air, but also the flow of cold air which normally enters the housing from below, enter the housing through the front. The housing of the exchanger is oriented relative to the axis of the jet engine so as to present two faces at the front of the jet engine, so that the cold air intake duct and the hot air intake duct can enter into the heat exchanger from the front. The term "from the front" should be understood to mean in relation to the flow of air outside the housing. The flow of cold air and the flow of hot air circulate perpendicularly to each other inside the housing. In one particular example, the flow of cold air, intended to circulate inside the heat exchanger, is taken not from the fan case ducting, but from a bifurcation which splits the flow of air entering into the jet engine into two flows passing respectively along the left side and the right side of the engine strut, upstream of the fan case ducting. This bifurcation, or separation fairing, is formed from a leading edge that is fixed, that is, has no kinematics. The cold air intake duct can therefore also be fixed at the level of the air intake situated in said bifurcation. The air is therefore no longer taken laterally, from one side or the other of the jet engine cowls, but from the front, parallel to the axis of the jet engine. The cold air intake duct arrives from the front at the housing and does not pass through the strut box.

The subject of the disclosed embodiments are therefore a propulsive assembly for aircraft comprising a jet engine and a heat exchanger situated above the jet engine and taking a flow of cooling air and a flow of hot air from the jet engine, characterized in that the inlet faces for the flow of cooling air and the flow of hot air into the housing are directed towards the front of the jet engine and have normals that are inclined relative to the axis of the jet engine.

According to exemplary embodiments of the propulsive unit according to the disclosed embodiments, said assembly can comprise all or some of the following additional characteristics:

the housing of the heat exchanger is joined to a top face of a strut for fixing the jet engine to the wings of the aircraft.

the flow of cooling air is taken from a bifurcation zone for circulating the air inside the cowls of the jet engine, upstream of the reverser cowls of said jet engine.

the housing is parallelepipedal, extending along the axis of the jet engine and positioned at an angle relative to said axis, the flow of cooling air entering via a first front inlet face into the housing and leaving via a first rear outlet face of said housing, the flow of hot air entering via a second front inlet face of the housing and leaving via a second rear outlet face of the housing.

the flow of cooling air and the flow of hot air circulate from front to back inside the housing, perpendicularly to each other.

the housing is parallelepipedal, extending transversely relative to the axis of the jet engine, the flow of cooling air entering via a bottom inlet face into the housing and leaving via a top outlet face of said housing, the flow of hot air entering via a front inlet face of the housing and leaving via a rear outlet face of said housing.

the flow of cooling air circulates from bottom to top inside the housing, the flow of hot air circulating from front to back inside said housing, the flow of cooling air and the flow of hot air circulating perpendicularly to each other inside the housing.

The disclosed embodiments also relate to an aircraft comprising at least one propulsive assembly according to the disclosed embodiments.

According to preferred exemplary embodiments, the aircraft is provided with two or four propulsive assemblies according to the disclosed embodiments.

The disclosed embodiments will be better understood from reading the description that follows and studying the accompanying figures. These are represented by way of indication and are by no means limiting on the disclosed embodiments. The figures represent:

DETAILED DESCRIPTION OF THE DRAWINGS

Figure 1A:
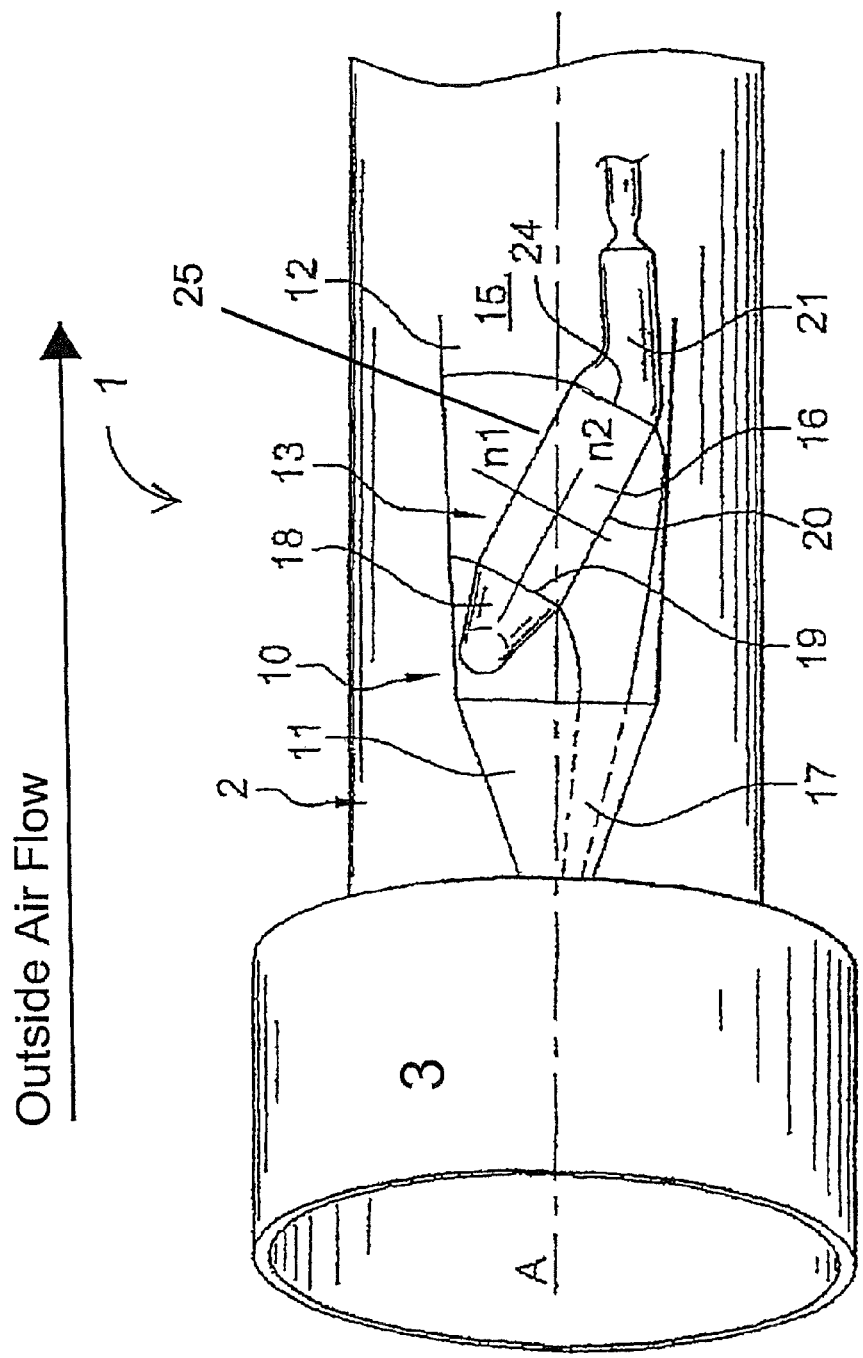
FIG. 1A: a top view of a propulsive assembly according to a first exemplary embodiment.

FIG. 1A shows a jet engine 1, with no nacelle. A strut 10 is used to fix the jet engine 1 to the wings of an aircraft (not represented). One pyramidal end 11 of the strut 10 is fixed to the back of the fan case 3 of the jet engine 1. A body 12, or box, of the strut 10 is fixed at two points to the engine 2 of the jet engine 1.

A heat exchanger 13 is joined to a top face 15 of the box 12 of the strut 10. The term "top face 15" should be understood to mean the face of the strut 10 directed towards the sky. The heat exchanger 13 comprises a housing 16 in which a flow of cooling air and a flow of hot air circulate, in order to cool the hot air which must be sent to an air conditioning circuit of the aircraft. The heat exchanger 13 also comprises air intake ducts 17, 18 bringing the air flows into the housing 16, and air exhaust means enabling the air flows to leave said housing 16.

Figure 1B:
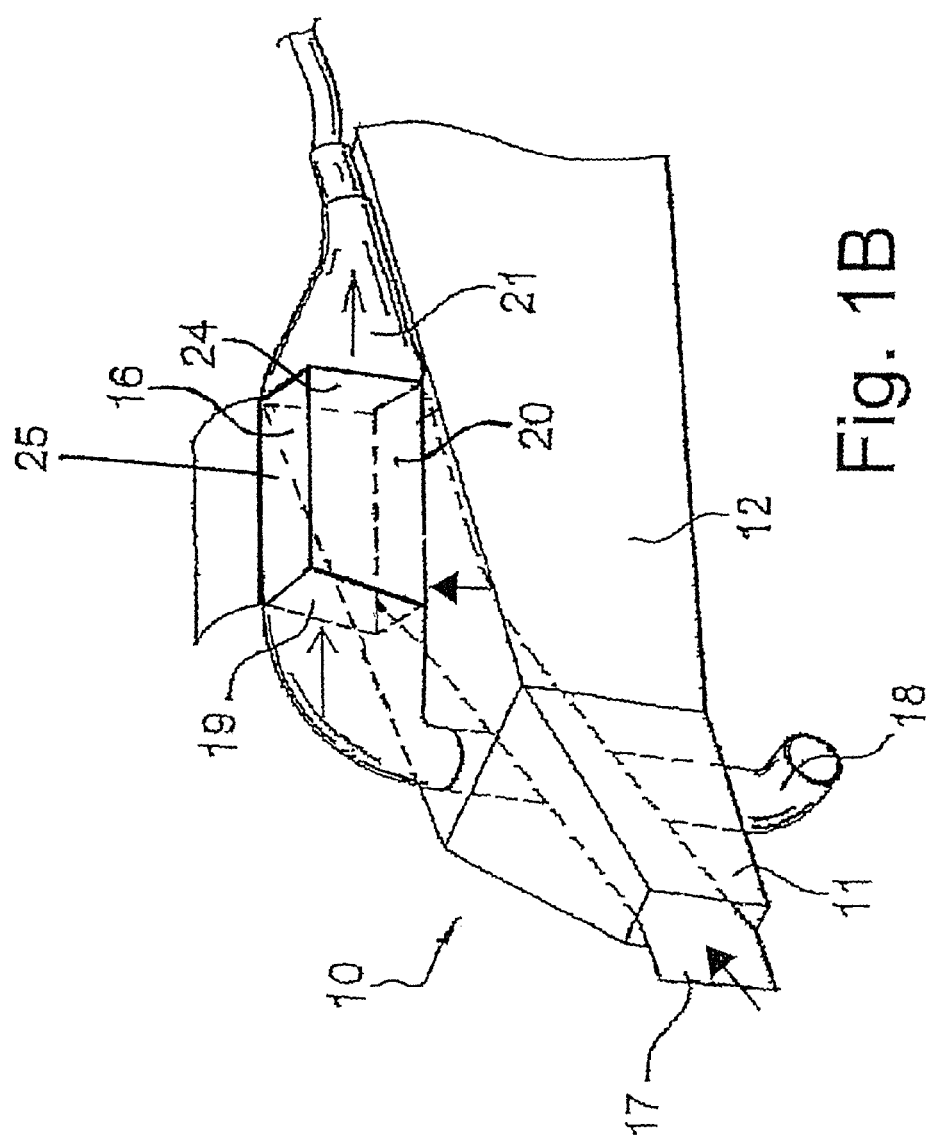
FIG. 1B: a diagrammatic representation in perspective view of the heat exchanger according to FIG. 1A.

The flow of cooling air passes from the fan case 3 to the housing 16 via a cooling air intake duct 17 and leaves the jet engine 1 for example through openings formed in the nacelle of said jet engine 1. The flow of hot air passes from the engine 2 to the housing 16 through a hot air intake duct 18 passing through the box 12 of the strut 10 height-wise. The hot air 18 and cooling air 17 intake ducts do not cross since the cooling air intake duct 17 passes through the pyramid 11 of the strut 10, whereas the hot air intake duct 18 passes through the box 12 (FIG. 1B).

The housing 16 has a generally rectangular shape and is arranged at an angle relative to the axis A of the jet engine 1 so as to present two front faces, respectively forming the cooling air 19 and hot air 20 inlet faces. The hot air 19 and cooling air 20 inlet faces have normals n1 and n2 inclined relative to the axis A of the jet engine 1. Each air intake duct 18, 17 enters into the housing 16 through a different front face 19, 20 of said housing 16, such that the air intake ducts 17, 18 no longer cross at the level of the housing 16.

Inside the housing 16, the flow of cooling air from the cooling air intake duct 17 and the flow of hot air from the hot air intake duct 18 circulate from front to back relative to the direction of movement of the aircraft. Inside the housing 16, the cooling air (large arrows) and hot air (smaller arrows) flows circulate in directions perpendicular to one another.

The flow of partially cooled hot air leaves the housing 16 through a hot air exhaust duct 21, at the rear outlet face 24 of the housing 16, in order to be taken away to an air conditioning circuit (not represented). Advantageously, the flow of cooling air leaving the housing 16 is discharged through a second rear outlet face 25 of said housing 16, towards the outside, in order to be able to be easily ejected from the engine strut.

In another exemplary embodiment, the housing 16 of the heat exchanger 13 can have a generally rhomboid shape, said rhombus extending along the axis A of the jet engine 1. Thus, the housing 16 here presents two front air inlet faces, making it possible to accommodate the cooling air intake duct 17 and the hot air intake duct 18.

Figure 2A:
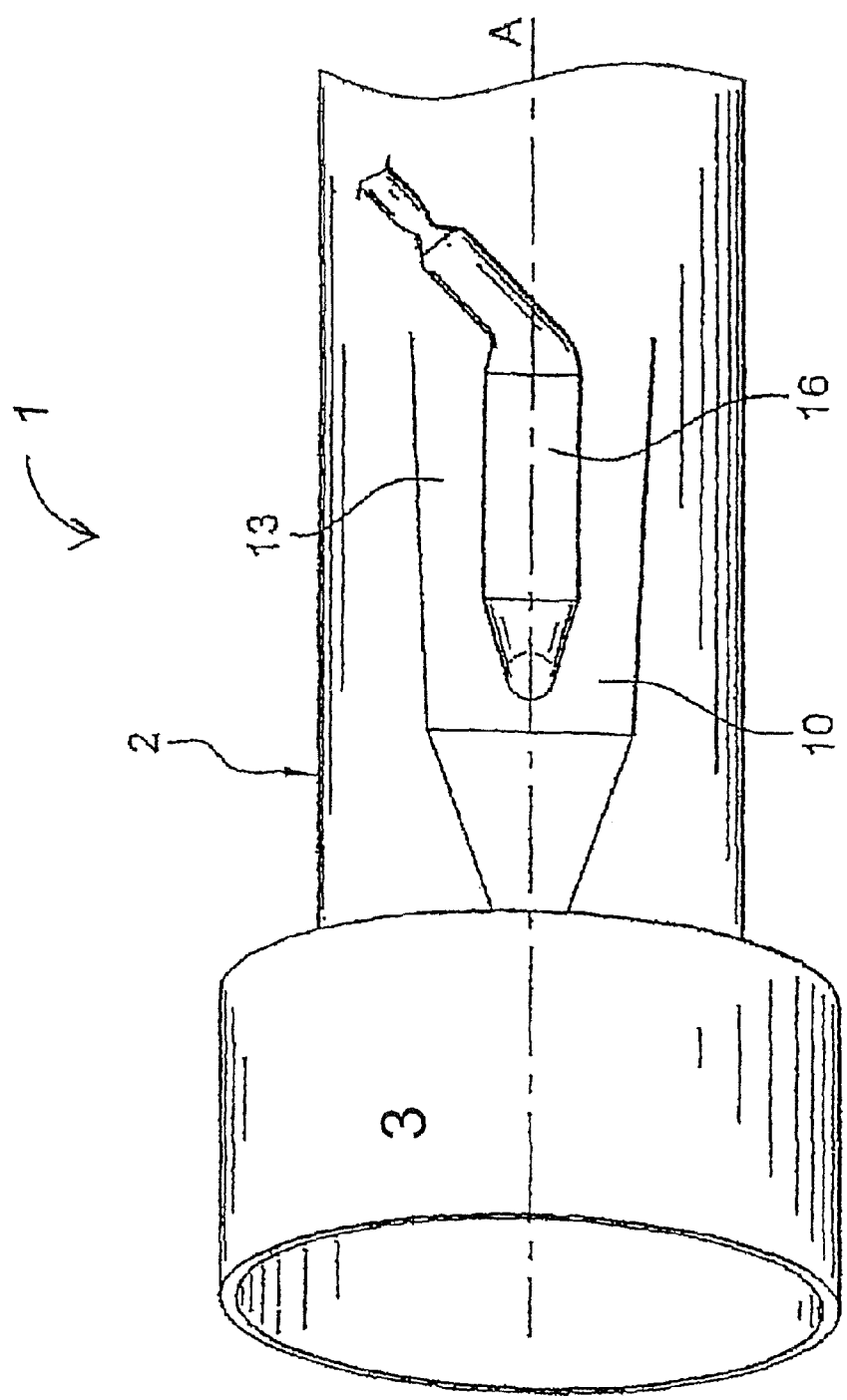
FIG. 2A: a top view of a propulsive assembly according to a second exemplary embodiment.

FIG. 2A shows another example of positioning of the heat exchanger 13 on the strut 10. The housing 16 has a generally rectangular shape.

Figure 2B:
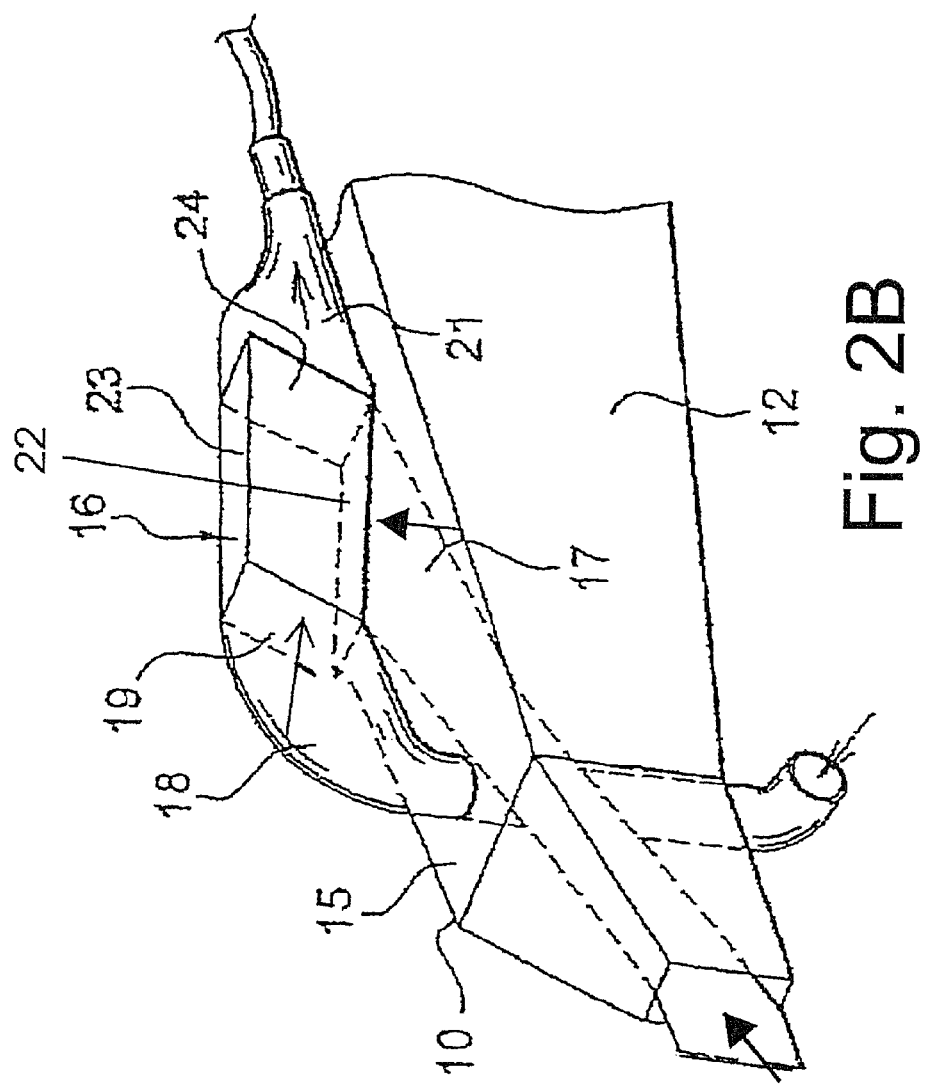
FIG. 2B: a diagrammatic representation in perspective view of the heat exchanger according to FIG. 2A.

As can be seen in FIG. 2B, the housing 16 is inclined on the strut 12, and extends transversely relative to the axis A of the jet engine 1. The bottom face 22 of the housing 16 is not joined to the top face 15 of the strut 10, but extends at an angle above said top face 15. The term "bottom face 22" should be understood to mean the face of the housing 16 directed towards the top face 15 of the strut 10. The housing 16 is, for example, joined to the top face 15 of the strut 10 by an edge common to the bottom face 22 and to the rear face of the housing 16.

The incline of the housing 16 is such that it allows access to the bottom face 22 of said housing 16. The bottom face 22 is therefore at the front of the jet engine 1, in the same way as the front face 19, which is raised on the strut 10 relative to the bottom face 22. The bottom 22 and front 19 faces face the flow of the air situated outside the exchanger. The bottom face 22 and the front face 19 have normals that are inclined relative to the axis A of the jet engine 1.

The flow of cooling air enters via the bottom face 22 into the housing 16, whereas the flow of hot air enters via the front face 19 into said housing 16. The flow of cooling air passes through the housing 16 from the bottom inlet face 22 to the top outlet face 23, whereas the flow of hot air passes through the housing 16 from the front inlet face 19 to the rear outlet face 24 of said housing 16. Thus the flow of cooling air passes through the housing perpendicularly relative to the flow of hot air. The heat exchanger 13 therefore works vertically.

The invention claimed is:

1. A propulsive assembly for aircraft comprising a jet engine placed under a strut and a heat exchanger joined to an outside face of a box of the strut and taking a flow of cooling air and a flow of hot air from the jet engine,
    wherein the heat exchanger comprises a housing arranged at an angle relative to an axis of the jet engine so as to present two front faces, respectively forming a cooling air inlet face and a hot air inlet face, these cooling air and hot air inlet faces being directed towards a front of the jet engine and facing the flow of the air situated outside the exchanger, wherein the cooling air and hot air inlet faces have normals that are inclined relative to the axis of the jet engine,
    wherein the flow of hot air passes from the engine to the housing through a hot air intake duct passing through the box of the strut height-wise and the flow of cooling air passes through a cooling air intake duct passing through a pyramidal end of the strut, and
    the flow of cooling air and the flow of hot air circulate from front to back inside the housing, perpendicularly to each other and exit on different faces of the housing.

2. A propulsive assembly according to claim 1, wherein the housing is parallelepipedal, extending along the axis of the jet engine and positioned at an angle relative to said axis, the flow of cooling air entering via a first front inlet face into the housing and leaving via a first rear outlet face of said housing, the flow of hot air entering via a second front inlet face of the housing and leaving via a second rear outlet face of the housing.

3. A propulsive assembly according to claim 1, wherein the housing is parallelepipedal, extending transversely relative to the axis of the jet engine, the flow of cooling air entering via a bottom inlet face into the housing and leaving via a top outlet face of said housing, the flow of hot air entering via a front inlet face of the housing and leaving via a rear outlet face of said housing.

4. A propulsive assembly according to claim 3, wherein the flow of cooling air circulates from bottom to top inside the housing, the flow of hot air circulating from front to back inside said housing, the flow of cooling air and the flow of hot air circulating perpendicularly to each other inside the housing.

5. An aircraft comprising at least one propulsive assembly according to claim 1.

* * * * *